United States Patent [19]
Dumitrou et al.

[11] Patent Number: 5,586,211
[45] Date of Patent: Dec. 17, 1996

[54] OPTICAL FIBER ORGANIZER AND METHOD USING SAME

[75] Inventors: Ion Dumitrou, Nynäshamn; Ola Hulten, Bromma; Håkan Ekwall, Tyresö, all of Sweden

[73] Assignee: Telefonaktiebolaget LM Ericsson, Stockholm, Sweden

[21] Appl. No.: 429,493

[22] Filed: Apr. 26, 1995

[30] Foreign Application Priority Data

Apr. 26, 1994 [SE] Sweden ................................. 9401421

[51] Int. Cl.⁶ ............................................... G02B 6/00
[52] U.S. Cl. ..................... 385/135; 385/134; 385/136; 385/137
[58] Field of Search .................................. 385/134, 135, 385/136, 137, 139, 147

[56] References Cited

U.S. PATENT DOCUMENTS

| | | | |
|---|---|---|---|
| 5,002,351 | 3/1991 | Szanto et al. | 385/96 X |
| 5,013,345 | 5/1991 | Itoh et al. | 65/42 |
| 5,046,813 | 9/1991 | Itoh et al. | 385/96 |
| 5,170,456 | 12/1992 | Itoh et al. | 385/96 |
| 5,182,789 | 1/1993 | Nash-Stevenson et al. | 385/137 |
| 5,195,153 | 3/1993 | Finzel | 385/70 |
| 5,208,893 | 5/1993 | McCall et al. | 385/135 |
| 5,216,741 | 6/1993 | Blijleven et al. | 385/137 |
| 5,416,882 | 5/1995 | Hakoun et al. | 385/136 |

FOREIGN PATENT DOCUMENTS

| | | | |
|---|---|---|---|
| 504519 | 9/1992 | European Pat. Off. | 385/96 X |
| 3724914 | 2/1989 | Germany | 385/96 X |
| 4025351 | 2/1992 | Germany | 385/96 X |
| 63-106706 | 5/1988 | Japan | 385/96 X |
| 2-6908 | 1/1990 | Japan | 385/96 X |
| 92012350 | 4/1992 | Sweden | 385/96 X |
| 9100979 | 10/1992 | Sweden | 385/96 X |
| 9100978 | 10/1992 | Sweden | 385/96 X |
| 9300522 | 2/1993 | Sweden | 385/96 X |
| 92018175 | 12/1993 | Sweden | 385/96 X |
| 92018183 | 12/1993 | Sweden | 385/96 X |
| 2201529 | 9/1988 | United Kingdom | 385/96 X |

OTHER PUBLICATIONS

I. Yokohama et al., "Fiber–Coupler Fabrication with Automatic Fusion–Elongation Processes for Low Excess Loss and High Coupling–Ratio Accuracy," *IEEE Journal of Lightwave Technology*, vol. LT–5, No. 7, pp. 910–915 (Jul. 1987).

*Primary Examiner*—Brian Healy
*Attorney, Agent, or Firm*—Burns, Doane, Swecker & Mathis, L.L.P.

[57] ABSTRACT

In splicing discrete individual optical fibers to a fiber ribbon cable, a fiber organizer is used for placing the loose fibers in a retainer so that they are located exactly in the same way as in a fiber ribbon cable. The retainer is a separate part which is placed, with its lids in an open position, in a lower, centrally located portion of a main part of the device. The individual fibers are inserted, one by one, in vertical slots which are aligned with each other and are located at each end of the fiber organizer. By a movable, elastic heel they are fed into horizontal, slotshaped spaces having heights or widths adapted to the diameter of the fibers and formed between lower and upper surfaces. When all fibers have been fed into the slot, the retainer lids can be swung down so that the individual fibers are securely retained in the retainer. Then upper parts at each end of the fiber organizer are opened whereby the fibers are separated from the fiber organizer, in particular from the slotshaped spaces, and the retainer can be removed together with the gripped individual fibers.

9 Claims, 3 Drawing Sheets

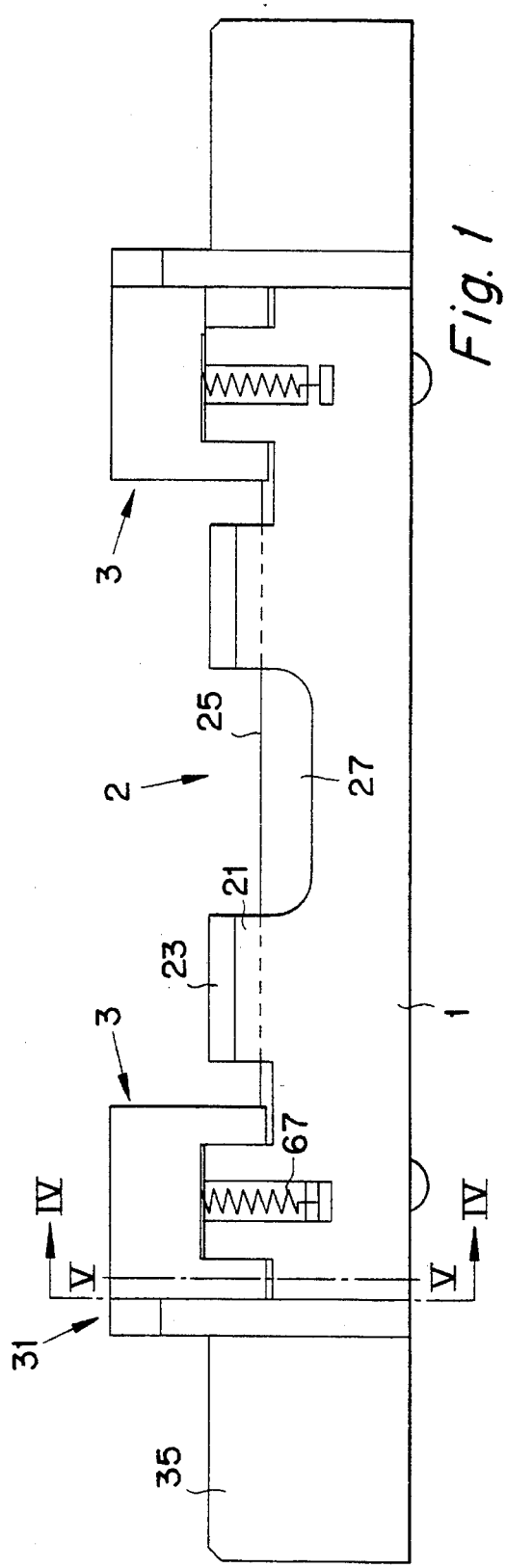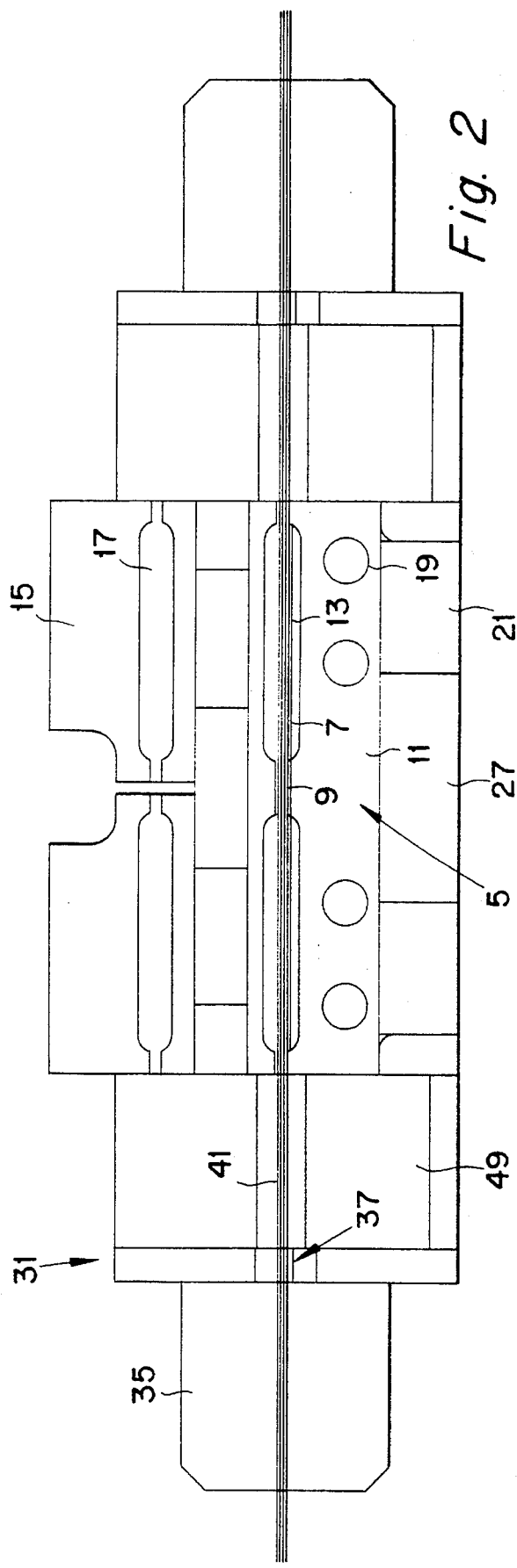

OPTICAL FIBER ORGANIZER AND METHOD USING SAME

TECHNICAL FIELD

The present invention relates to a fiber organizer by means of which an organisation, that is a retaining in a desired configuration, of discrete individual optical fibers, which are to be spliced to a fiber ribbon cable, can be achieved.

BACKGROUND

Optical fibers maintained as one unit of type ribbon cable, usually called fiber ribbon cable, are increasingly used side by side with "classical" discrete optical fibers. Naturally then, in practical use, interconnections must be made between the discrete optical fibers and the fiber parts of the fiber ribbon cable. This can be a complicated process requiring a lot of time and work, in particular comprising a lot of manual work, which of course causes high costs. There is therefore a need for devices which can facilitate the splicing of individual fibers to a fiber ribbon cable. One possibility is to place end portions of the discrete optical fibers in a narrow slot and parallel to each other and then pressing the fiber ends laterally against each other whereby the discrete fibers are positioned in the same way as the individual optical fiber parts in a fiber ribbon cable.

PRIOR ART

U.S. Pat. Nos. 5,170,456 and 5,046,813 show devices of the kind mentioned above for organizing and orientating several discrete optical fibers in association with fusion splicing the same. Two embodiments are described, where the fibers ends are placed on a table, a lid is closed over the fiber ends and they are pressed together.

In the German patent application DE-A1 40 25 351 for Philips Patentverwaltung GmbH a device is disclosed for splicing optical fibers. The device comprises a narrow slot into which for instance four fibers are placed and are pressed by a manually operated sheet member to be positioned in parallel to each other.

SUMMARY

It is an object of the invention to provide simple means for a parallel organizing or positioning of several discrete loose optical fibers parallel to each other like in a fiber ribbon cable, in order to facilitate splicing of these discrete fibers to a fiber ribbon cable.

The mentioned object is achieved by the invention, the more detailed characteristics of which appear from the appended claims.

When splicing discrete loose optical fibers to a fiber ribbon cable the discrete fibers are placed in a retainer assuring that they are arranged exactly as in a fiber ribbon cable. The retainer is a separate part, which with opened lids is placed in the fiber organizer. The discrete fibers are inserted one by one in suitably vertical slots, which are aligned with each other and are located at each end of the fiber organizer. By means of a movable, elastic heel located at each end they are fed into slotshaped spaces extending in a not too small angle, e.g. between 45° and 135°, to the insert slots, these slots in particular extending in a horizontal direction with a height or width adequate for or adapted to the diameter of one fiber. The retainer lids are swung down so that the discrete fibers are securely retained in the retainer. Thereafter upper parts at each end of the fiber organizer are opened, at the lower parts of which the slotshaped spaces or in the preferred embodiment the horizontal slots are located whereby the fibers are separated from the fiber organizer and the retainer can be removed from it together with the aligned parallel gripped individual fibers. The upper parts are forced to either of two positions by a spring located suitably inside the upper parts located spring, one swung-down position in which the slotshaped spaces are formed and one swung-up position with free fibers.

Thus generally elongated elements such as in particular optical fibers, which are of a cylindrical type and all having essentially the same diameter or largest dimension as seen in a cross section, can be placed close to or at each other against a surface so that longitudinal areas of the elements are in contact with each other, by inserting the elements one by one into a slot having a width somewhat exceeding the diameter or the largest measure and which is open at one side for receiving the elements, and from there to a slotshaped space between a first lower surface extending in an angle to the sides of the insert slot, in particular within an angular range located centrally around 90°, especially in an angle between 45° and 135° and preferably essentially 90°, and a second upper surface located above or generally alongside the first surface at a uniform distance therefrom, this distance essentially corresponding to the diameter or the largest dimension of the fibers.

During the transition from the slot to the slotshaped space, the elements are affected by an elastic heel having an operative surface which is located at the connection region between the slot and the first and second surfaces and which is elastic in a direction essentially parallel to the first and second surfaces and essentially perpendicular to an intersection line between the side surfaces of the slot and the first and second surfaces. The heel feeds the elements into the slotshaped space and maintains the elements in contact with each other. The elastic heel is advantageously hingely mounted or articulated at a hinge axis essentially parallel to the intersection line of the side surfaces of the slot and the first lower surface and of the side surfaces of the slot and the second upper surface. The elastic effect can be achieved by a compression spring acting on a surface of the heel which is located essentially opposite to its operative surface.

The slotshaped space is advantageously delimited by a side of a stop surface formed by a shoulder at the end of the second upper surface. The stop surface shall then be located essentially perpendicular to the upper surface and essentially parallel to the intersection line between the side surfaces of the slot and the lower and upper surfaces.

The device can be designed for positioning the elongated elements parallel to and aligned with each other in grooves of a retainer, the grooves being arranged in parallel to and adjacent each other and the spacing of the grooves essentially corresponding to the diameter or the largest dimension of the fibers. It then has a main part comprising a central part for receiving the retainer and also two end parts located opposite to each other at both sides of the central section. At each end part there are groove means aligned with each other for receiving the elongated elements and for positioning them next to each other with longitudinal surfaces thereof in contact with each other. Openable side parts which can be swung up may be included, which form a side surface of the slot means and which can be opened for releasing the elongated elements, when these one by one have been positioned in the slot means and hereby in the grooves of the retainer.

BRIEF DESCRIPTION OF THE DRAWINGS

The invention will now be described in more detail by way of a not limiting embodiment with reference to the accompanying drawings, in which:

FIG. 1 is a front view of a fiber organizer for discrete optical fibers,

FIG. 2 is a view from above of the same fiber organizer having a fiber retainer placed therein and inserted optical fibers.

DETAILED DESCRIPTION

Figure 3:
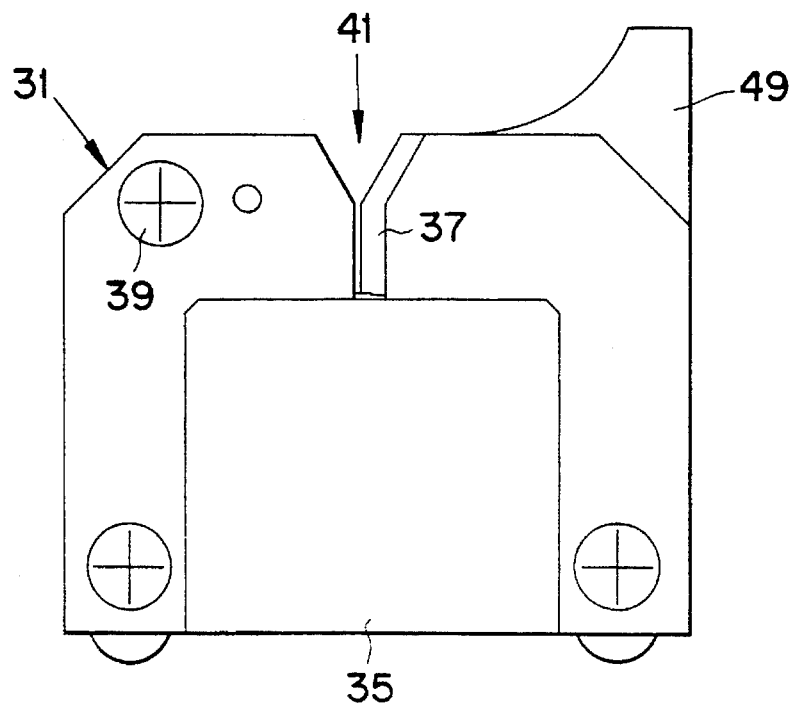
FIG. 3 is a side view of the fiber organizer with attached end plates.

In FIG. 1 a device for organizing loose optical fibers is shown as seen from the front side thereof, and in FIG. 2 the same device is shown together with a detachable fiber retainer placed in the device and with schematically indicated inserted fibers as seen from above. The device comprises a main or base part 1 having a lower central portion 2 and higher portions 3 arranged at both ends or sides of the central portion. In the lower central portion 2 a fiber retainer can be placed, generally denoted by 5, which at 7 has parallel grooves for several optical fibers 9, in the shown embodiment for four fibers. The grooves 7 may have the common V-shape used for positioning and retaining optical fibers.

The retainer 5 comprises a generally elongated, rectangular base plate 11, having two pedestals 13 arranged thereon which are similar to and aligned with-each other and on the top surfaces of which the grooves 7 are arranged, the grooves 7 on both pedestals 13 being aligned with other. At the rear side of the retainer 5 there are two lids 15 which are similar to each other and can be swung down to contact, with elastic projecting parts 17 arranged thereon, the top surfaces of the fibers 9 for securely retaining the fibers in the grooves 7. In the swung down positions each of the lids 15 will cover one of the pedestals 13 and they are maintained in these positions by the attractive force from magnets 19 arranged in the base plate 11.

The retainer 5 is positioned at the central portion 2 by means of upwardly projecting parts on this portion, there being arranged two lower projections 21 at the front side and two higher projections 23 at the rear side of the base part 1. The retainer is then placed on a flat portion 25 located between these projections and between the higher end portions 3. At the front and rear side of the central lower portion 2 of the base 1 there are also recesses, one of which is shown at 27, allowing that the retainer 5 can be easily gripped at its side surfaces when located on the central portion 2.

To each of the higher end portions 3 an end plate 31 is secured, the higher portions 3 being thus located neighbouring the central portion 2 and at the place where the retainer 5 is to be placed. A vertical longitudinal slot-shaped space passes through each higher end portion 3 allowing fibers to be inserted therein from above. At the end plates 31 there are platforms 35 having their top surface located approximately coplanar with, that is at the same level as, the top surfaces of the pedestals 13 when the retainer 5 is properly placed at the central portion 2, see also FIG. 3. The vertical slot 37 in the end plates is rather wide having an upper bevelled opening, the width of the opening being adapted to receive the width of several optical fibers arranged as a flat bunch of fibers. The end plates 31 are attached to the higher end portions 3 of the base 1 by screws or bolts 39 cooperating with threaded holes 40 in the end surfaces of the base 1.

Figure 4:
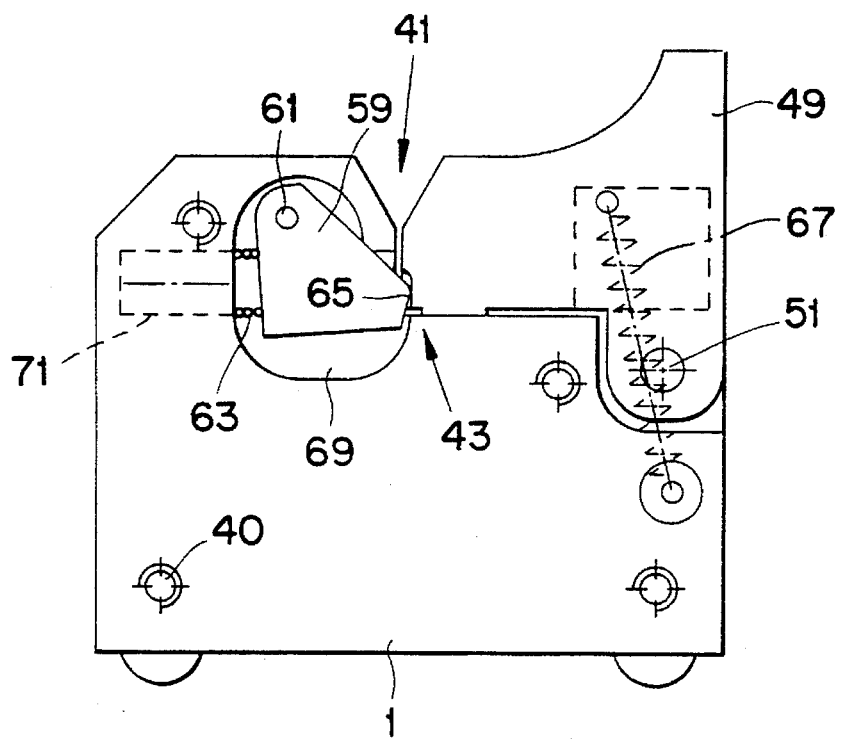
FIG. 4 is a side view of the base part of the fiber organizer, the end plate being removed.
Figure 5A:
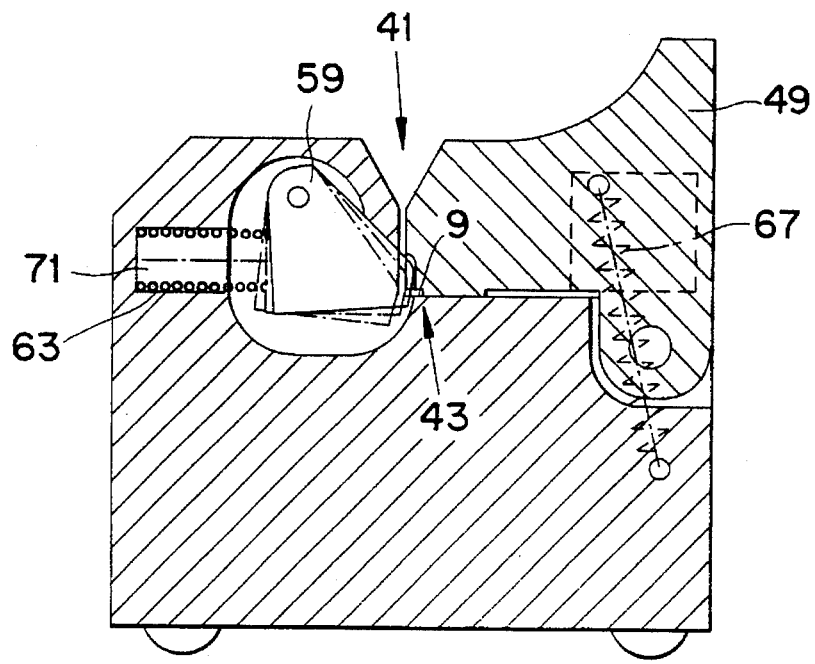
FIG. 5a is a sectional view of a high end portion of the base of the organizer having slot feeding means and FIG. 5b is a sectional view similar to FIG. 4 in a larger scale with a part, which can be swung up.
Figure 5B:
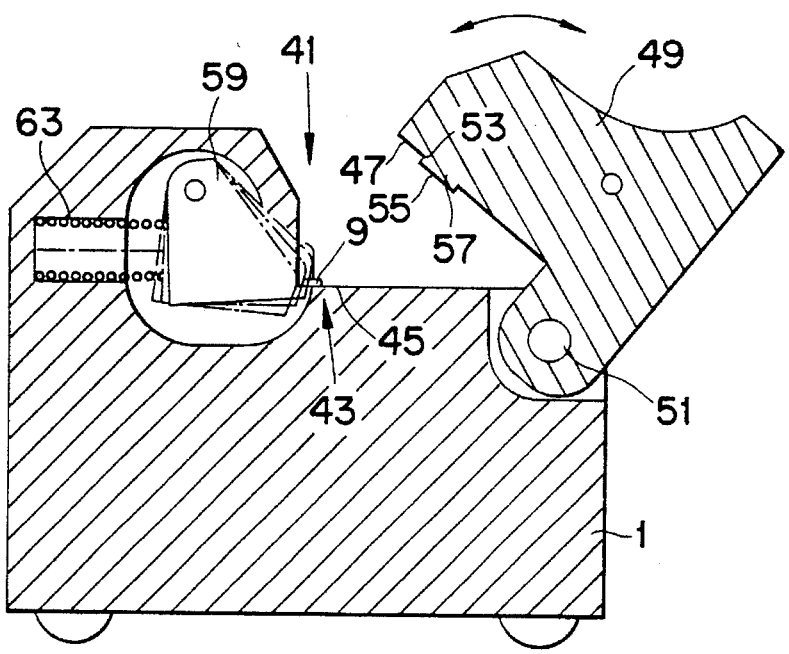

The vertical longitudinal slots 41 in each of the higher portions 3 are narrow, the width being adapted to receive only one optical fiber at a time from above, see also the side view of the device in FIG. 4 and the sectional view of FIG. 5a. The vertical slot 41 connects to a horizontally positioned slotshaped space, shown at 43 in the FIGS. 4 and 5a. The slotshaped space 43 is formed between an upper flat horizontal surface 45 of the main base part 1, see the sectional view of FIG. 5b, and a flat lower surface 47 at the inner side of a rotatable part 49, which can be swung up and out from the folded-down position in FIG. 5a and at 51 is hinged to the main part 1. The lower flat surface 47 at the inner, rear side of the rotatable part 51 ends in a shoulder 53. To this shoulder 53 another flat surface 55, parallel to the first flat surface 47, is connected and the shoulder 53 and this other flat surface 55 are located on a heel 57. When the rotatable part 49 is swung down the flat surface 55 of the heel 57 rests against the upper flat support surface 45 of the main part 1. The slotshaped space 43 formed between the surfaces 45 and 47 has a height corresponding to the diameter of the optical fibers for which the device is intended to be used. The width of the vertically positioned slot 41 also corresponds to essentially this diameter but may also be somewhat larger.

The use of the device will now be explained as will some more details of the device. First the fiber retainer 5 is placed in the central lower space 2 in the main part 1. The lids 15 of the retainer 5 are swung up so that the guides 7 for the fibers are exposed. An optical fiber is inserted simultaneously in the two vertical slots 41 which are aligned with each other and are located in the two higher portions 3 of the main part 1. The fiber is hereby gripped by an operator at regions located on both end sides of the main part 1 and is inserted until the fiber contacts the upper surfaces of the platforms 35 which are located at the end sides of the end plates 31, see FIGS. 1 and 2. When the fiber is inserted and approaches the bottom of the slot 41, just before it comes into contact with the upper surface of the platform 35, which is located in the same plane as the upper surface of the retainer pedestals 13, see FIGS. 1 and 3, the fiber gets in contact with an elastically mounted heel 59.

The elastic heel 59 generally has the shape of an approximately isosceles, right-angled triangle, as seen from the side thereof, and is articulated at a hinge 61 at one of the acute angles, that is that is one of the angles having an angle of about 45° in the triangular shape. The elastic effect is achieved by a helical compression spring 63, acting on one of the equally large sides of the heel 59, more particularly the surface connected to the mentioned angle of about 45°. The spring 63 then has an axis which extends horizontally and perpendicularly to the slot 41 and to the hinge 61. At the second acute angle of the triangular shaped heel 59 which then also has an angle of about 45° there is a bevel or an inclined and rounded surface 65 and this surface comes in contact with an optical fiber when the fiber is inserted through the slot 41. When the fiber is inserted, the heel 59 is thus pushed back and performs a rotating movement around the axis 61. In the bottom position, when the fiber gets in contact with or Just rests at the surface 45 of the main part 1 and against the upper surface of the platforms 35, the fiber is pushed by the rounded surface 65 into the slotshaped space 43 between the flat parallel surfaces 45 and 47. The rotatable part 49 is hereby, as assumed above, swung down to its lower position and is kept in this position by means of compression or tension springs 67 mounted at suitably located places in recesses therefor, see FIGS. 1, 4 and 5a.

The springs are arranged to give the rotatable part 49 a stabile position where it presses against the top surface 45 of the higher end portions 3 and another position swung away from that surface. By means of the elastic heel 59 the first optical fiber is pushed into and up to the end of the space 43 between the surfaces 45 and 47 until it gets in contact with the shoulder 53 located on the lower surface of the rotatable part 49.

The elastic heel 59 is mounted in a cavity or recess 69 in the higher end part 3 at the end surface thereof, adjacent to the end parts 31. Also, the spring 63 is located in a suitable cavity 71 adapted therefor in the end part 3. The hinge 61 of the elastic heel is formed by a pin mounted in aligned bores in the higher end part 3 and in the end plate 31.

Thereafter the same procedure is executed for the next optical fiber, which after the insertion thereof will be positioned in the slotshaped horizontal space 43 and will rest against the previously inserted optical fiber and pressed against this by the elastic heel 59. The procedure is repeated until the intended number of, e.g. four, optical fibers have been entered in the space 43. Thereafter the lids 15 of the retainer 5 are closed and are maintained in their closed position, not shown, by means of the magnets 19. After this the rotatable parts 49 are swung up from their lowered or folded position, see FIG. 5b, so that the segments of the fibers which are brought together and which are retained in the slotshaped spaces 43 in the higher sections 3 are released. Then the fiber retainer 5 with the optical fibers retained therein can be detached from the main part 1. The optical fibers will then, by means of a suitable design of the guide grooves 7 of the fiber retainer 5, become positioned exactly as the optical fibers in a fiber ribbon cable. The loose ends, protruding from one end of the fiber retainer 5, can be treated in the conventional way for splicing. Thus the protective plastic enclosure is first removed at the end areas of the individual fibers, whereafter these in a conventional manner are cut off. The fiber retainer 5 with fibers is positioned in a splicing apparatus (not shown) for interconnection to a fiber ribbon cable.

We claim:

1. A device for positioning elongated elements, all having substantially the same diameter or largest dimension, as seen in a cross section, in particular optical fibers, against or next to a surface, aligned or next to each other and with longitudinal areas of the elements in contact with each other, comprising:

a slot having a width somewhat exceeding the diameter or the largest dimension and which is open at one side for receiving the elongated elements, a first surface forming an angle to the sides of the slot, and a second surface located close to the first surface at a uniform distance from this substantially corresponding to the diameter or the largest dimension, and further comprising an elastic heel which has an operative surface positioned at the connection region between the slot and the first and second surfaces and which is elastic in a direction which is substantially parallel to the first and second surfaces and substantially perpendicular to intersection lines between the side surfaces of the slot and the first and second surfaces.

2. A device according to claim 1, wherein the elastic heel is hingely mounted with a hinge axis substantially parallel to intersection lines between the side surfaces of the slot and the first and second surfaces.

3. A device according to claim 1, wherein associated with the elastic heel there is a pressure spring acting on a surface of the heel which is substantially opposite to the operative surface of the heel.

4. A device according to claim 1, wherein the second surface ends in a shoulder having a stop face located substantially perpendicular to the second surface and substantially parallel to the intersection line between the side surfaces of the slot and the second surface.

5. A method for positioning elongated elements, all having substantially the same diameter or largest dimension as seen in a cross section, in particular optical fibers, against or next to a surface, aligned with or next to each other and with longitudinal areas of the elements in contact with each other, comprising the steps of:

inserting the elements one by one into a slot having a width somewhat exceeding the diameter or the largest dimension and which is open at one side, and feeding an element, when it has been inserted a distance into the slot, into a slotshaped space formed by a first surface forming an angle to the sides of the slot, and by a second surface located close to the first surface at a uniform distance from this substantially corresponding to the diameter or the largest dimension, wherein an operative surface of an elastic heel is positioned at a connection region between the slot and the first and second surfaces, the elastic heel being elastic in a direction which is substantially parallel to the first and second surfaces and substantially perpendicular to intersection lines between the sides of the slot and the first and second surfaces.

6. A device for positioning elongated elements, all having substantially the same diameter or largest dimension as seen in a cross section, in particular optical fibers, in slots located in parallel and next to each other in a retainer, where the distance between the slots substantially corresponds to the diameter or the largest dimension, the device including a main part comprising a central part for receiving the retainer, two end parts positioned opposite to each other at both sides of the central part, slot means aligned with each other at each end part for receiving the elongated elements and for positioning them next to each other with longitudinal surfaces thereof in contact with each other, wherein the slot means comprise first slots which are aligned with each other, in particular being substantially vertical, and second slots which are aligned with each and form an angle to the first slots, in particular being substantially horizontal, elastic heels being provided to operate at a fiber when it is inserted into the first slots to push it into the second slots.

7. A device according to claim 6, further comprising openable side portions forming a side surface in the second slots and which can be opened for releasing the elongated elements when they are placed in the retainer.

8. A device according to claim 1, wherein the angle formed by the first surface to the sides of the slot is within an angular range located centrally around 90°, especially an angle between 45° and 135° and preferably substantially 90°.

9. A method according to claim 5, wherein the angle formed by the first surface to the sides of the slot is within an angular range located centrally around 90°, especially an angle between 45° and 135° and preferably substantially 90°.

* * * * *